E. D. Brainard.
Preserving Animal & Vegetable Substances
N° 73292      Patented Jan. 14, 1868.
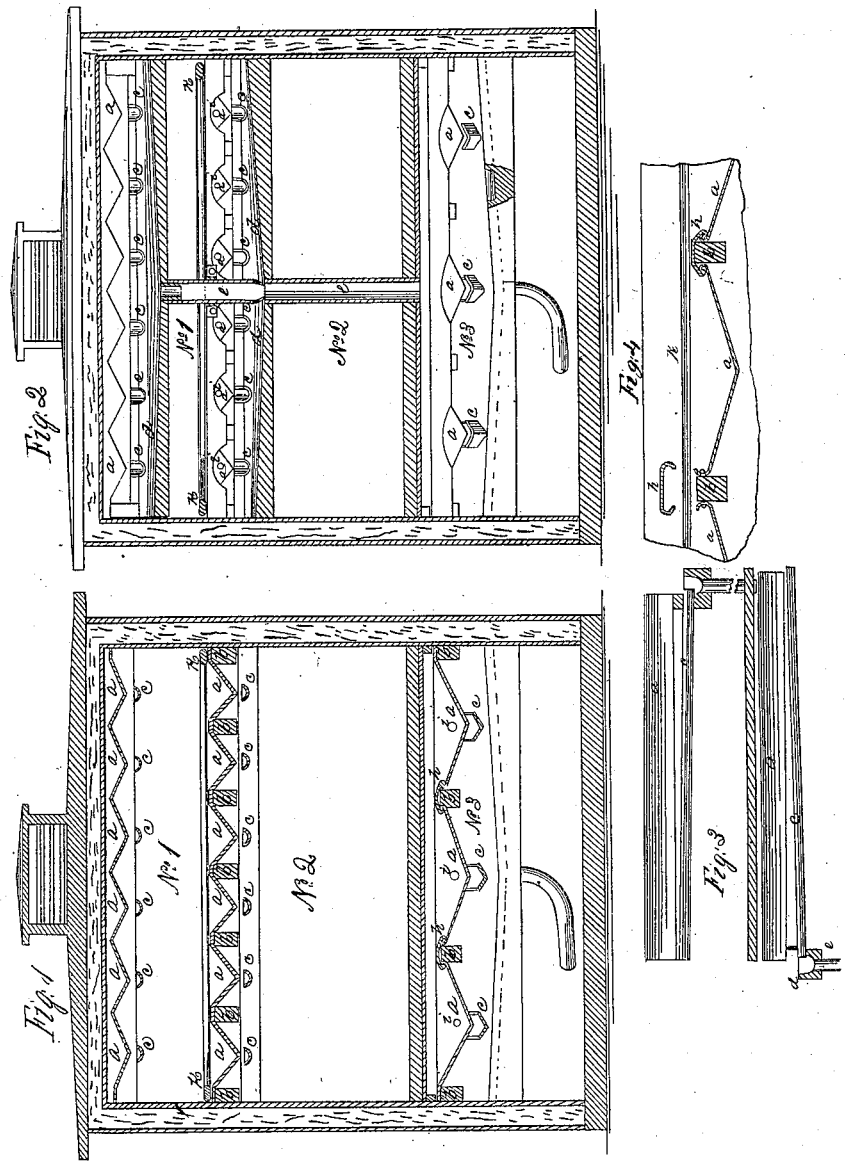

United States Patent Office.

EDWIN D. BRAINARD, OF ALBANY, NEW YORK.

Letters Patent No. 73,292, dated January 14, 1868.

IMPROVED REFRIGERATING AND CONDENSING-APPARATUS FOR PRESERVING ANIMAL AND VEGETABLE SUBSTANCES.

The Schedule referred to in these Letters Patent and making part of the same.

TO ALL WHOM IT MAY CONCERN:

Be it known that I, EDWIN D. BRAINARD, of Albany, in the county of Albany, and State of New York, have invented a new and improved Condensing and Refrigerating-Apparatus for Preserving Animal and Vegetable Substances, and for other purposes; and I do hereby declare that the following is a full, clear, and exact description thereof, which will enable those skilled in the art to make and use the same, reference being had to the accompanying plate of drawings, forming part of this specification.

Figure 1 represents a vertical section through a building or storehouse, provided with my improved condensing-apparatus, which is cut in cross-section.

Figure 2 represents the same building, with the front side removed to exhibit an end view of my improved condensing-apparatus.

Figure 3 is a longitudinal view of a detached part of the condensing-apparatus.

Figure 4 is a transverse section of a part of the condensing-apparatus, showing a detail of the construction.

Similar letters of reference indicate corresponding parts.

This invention relates to an improved apparatus for condensing and collecting the moisture of the air in a box, room, or chamber of any kind, and catching and conducting away the water of condensation.

The apparatus consists of a set of iron or other sheet-metal troughs or condensers, forming the ceiling or roof of a box, room, or chamber, and a corresponding set of gutters placed under or at the bottom of the troughs to catch the water of condensation dripping from the outer surface of the troughs, and conduct it away out of the box, room, chamber, or cellar.

By means of this apparatus, connected with an ice-chamber, the air contained in a box, room, chamber, or cellar, when made air-tight, is deprived of its moisture by the condensation thereof on the colder surface of the metal troughs, and the temperature of the air is reduced to a low degree. Thus, a dry and cold atmosphere may be produced in a box, room, chamber, or cellar, and maintained at a regular temperature for as long a period as desired.

This improved condensing and refrigerating-apparatus has many useful applications, such as refrigerators for domestic use, storehouses for preserving, and rail-cars and vessels for transporting and keeping sound fresh fruits, vegetables, meats, butter, lard, and other perishable animal and vegetable substances.

For breweries and other establishments requiring a cool and even temperature, and for the chambers of ice-houses, this improved condensing-apparatus is also equally applicable and useful. When applied to an ice-house it saves the ice, and for a lager-beer brewery it is especially valuable on account of the following advantages, to wit:

First. By the perfect control and regulation of the temperature of the fermenting-chamber at a low degree of heat, the fermenting process can be carried on successfully without interruption at all seasons of the year, in the coldest as well as in the warmest weather, and without moving the tubs.

Second. By perfectly dry and cool air in the storage-cellars or chambers, mould and rust on the casks and metal will be prevented, and no change will take place in the condition of the beer. A low temperature and dry air uniformly maintained in the storage-chambers will prevent the generation of carbonic acid gas, and keep this destructive element in beer-cellars under careful subjection.

The following is a full description of my improved condensing and refrigerating-apparatus:

The drawings, figs. 1, 2, represent a building of several stories, the upper one of which is an ice-chamber, No. 1, and the lower stories, Nos. 2, 3, are preserving or storing-chambers, all containing my condensing-apparatus, constructed alike, and referred to by the same letters. The walls are double, of sheet iron, and packed as usual.

The condensing-troughs $a$ $a$ are made of galvanized iron. They are secured to the timbers $b$ $b$, running between them longitudinally, to form a tight ceiling or roof of a chamber, and are fastened to each other upon the floor, timbers or rafters, without nails, rivets, or solder, as hereinafter described. The condensing-troughs $a$ $a$, forming the ceiling or roof of a box, room, or chamber, are made cold by ice placed in a chamber immediately above, or by cold water conveyed to them by pipes. Their outer or under surfaces thus become condensers of the moisture in the chamber, which is attached, and rises from below with the warmer currents of air. The water of condensation, thus collected on the troughs, drips or trickles down their converging sides, and falls into the gutters $c\ c$ under them. The drip-gutters $c\ c$ are made of wood, preferably, as it is the best material for the purpose, and they conduct the water of condensation to a cross-gutter, $d\ d$, fig. 2, placed under their lower ends, from which a pipe, $e$, leads the water to a lower chamber to be utilized in another set of troughs, or carries it away to the outside to be discharged through a trap of ordinary construction. The condensing-troughs $a\ a$ have outlets or holes, $i\ i$, in one end, at any desired level, for containing ice-water, through which holes the ice-water flows into the cross-gutters $d\ d$, to be carried by the pipe $e$ into the set of troughs in a lower chamber, when required, or directly to the outside to be discharged. The arrangement of pipes for conducting the water of condensation from the drip-gutters $c\ c$, and the condensing-troughs $a\ a$, may be varied to suit the circumstances, the only essential point being the provision of a trap at the lower end of the discharge-pipe to prevent external air from passing through the discharge-pipe into the chamber.

Two or more stories of a warehouse for preserving vegetable or animal substances may thus be operated on, or, by the same ice-water, with a trifling difference of temperature in the chamber, adapted to articles of different kinds.

The condensing-troughs, when placed over an ice-chamber, will collect, on their colder metallic surfaces, the vapor that rises from the ice when it melts, and the water of condensation will be carried off by the drip-gutters instead of falling back upon the ice, and thereby wasting it rapidly, as in ordinary ice-chambers when there is no ventilation. The condensing-troughs are placed between the floor-timbers or rafters $b\ b$, and secured by caps $h\ h$, resting on the timbers. The edges of the sheet-iron troughs and caps are turned over and united by a closed double seam, as shown in fig. 4, in cross-section. The troughs and caps, thus closed and bound together at the edges, form a strong water and air-tight ceiling or floor without rivets or solder. The ends of the troughs and caps and the outside troughs are soldered to the inside metal lining of the chamber. The ice in the ice-chamber rests upon narrow battens or cross-bars, $k\ k$, which lie upon the caps $h\ h$, so that the weight is sustained by the floor-timbers, and the troughs have no strain upon them, bearing, as they do, only the weight of the ice or waste water which they contain. Between the battens $k\ k$ and the caps $h\ h$, wire grating may be laid to catch any litter or trash among the ice.

I am aware that metal troughs or basins have been employed in the bottom of ice-boxes of refrigerators for catching the waste water produced by the melting of the ice, but they have been made in this form only to catch and carry off the waste water, while their under surfaces would condense the moisture of the air without any provision of gutters to catch and carry away the water of condensation, which drip-gutters, under-troughs, or basins, forming an air and water-tight ceiling of a box, room, or chamber, as described, constitute the essential principle and the novel and valuable feature of my invention. Without the provision of drip-gutters under the ceiling to catch the water of condensation and carry it off, the water will drip down from the ceiling into the chamber, and unless it is absorbed by chemical absorbents, the air in the chamber will remain charged with moisture, which is the cause of disintegration and decay with animal and vegetable substances exposed to it. The water of condensation being caught and removed by the drip-gutters of my invention, as soon as it is formed on the outer surfaces of the troughs or basins forming the ceiling of a chamber, the air therein is rapidly desiccated and refrigerated, producing those two conditions of dryness and coolness of atmosphere which are essential for the preservation of animal and vegetable substances.

I am aware that apparatus for condensing the moisture of the atmosphere in refrigerating-chambers and conducting it therefrom, has been previously employed, and I do not claim apparatus for this purpose broadly, but an improved method of construction and arrangement of apparatus, whereby great economy, strength, and durability are combined in the structure, and a more perfect operation of the principle of condensation and conduction of the moisture of the atmosphere in a refrigerating-chamber are secured.

Having thus described my invention, I claim as new, and desire to secure by Letters Patent—

1. The combination of the drip-gutters and the condensing and refrigerating-troughs or condensers, forming the ceiling of a chamber, constructed and arranged substantially as described, and operating as and for the purposes herein set forth.

2. The method of forming the condensing-troughs, by uniting the sides to a cup with closed double seams, substantially as described.

The above specification of my invention signed by me, this 12th day of November, 1867.

EDWIN D. BRAINARD,

Witnesses:
R. BANCROFT,
GEO. YOUNG.